United States Patent
Younger et al.

(10) Patent No.: US 10,460,743 B2
(45) Date of Patent: Oct. 29, 2019

(54) LOW-POWER CONVENIENT SYSTEM FOR CAPTURING A SOUND

(71) Applicant: HALLMARK CARDS INCORPORATED, Kansas City, MO (US)

(72) Inventors: Max J. Younger, Roeland Park, KS (US); Christian Cochran, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 45 days.

(21) Appl. No.: 15/862,324

(22) Filed: Jan. 4, 2018

(65) Prior Publication Data

US 2018/0190305 A1 Jul. 5, 2018

Related U.S. Application Data

(60) Provisional application No. 62/442,821, filed on Jan. 5, 2017.

(51) Int. Cl.
  *G10L 21/003* (2013.01)
  *H04M 1/65* (2006.01)

(52) U.S. Cl.
  CPC ......... *G10L 21/003* (2013.01); *H04M 1/6505* (2013.01)

(58) Field of Classification Search
  CPC ............. H04N 21/44008; H04N 21/84; H04N 21/4532; H04N 21/4821; H04N 21/4331;
  (Continued)

(56) References Cited

U.S. PATENT DOCUMENTS 5,444,673 A  8/1995 Mathurin
5,495,357 A  2/1996 Osterhout
(Continued)

FOREIGN PATENT DOCUMENTS

CA    2879423 A1  1/2014
WO   2014015031 A1  1/2014
WO   2014016645 A1  1/2014

OTHER PUBLICATIONS

International Search Report and Written Opinion dated Mar. 26, 2018 in International Patent Application No. PCT/US2018/012591, 11 pages.
(Continued)

*Primary Examiner* — Akelaw Teshale
(74) *Attorney, Agent, or Firm* — Shook, Hardy & Bacon L.L.P.

(57) ABSTRACT

Systems, methods and computer-readable media are provided for capturing audio that is memorable. Buffered audio is stored in a first device over a recent interval such as 5 minutes. In the absence of an indication a circular buffer is used that continually replaces old audio. When a user hears something that he wants to capture, he manipulates a control on the first device that results in buffered audio being transferred to another storage area. An audio file is automatically created. A second device can receive the created audio file, and it is capable of annotating the audio with a more descriptive title, an appropriate photo, etc. The second device is also able to provide a control interface for the capture application in the first device.

20 Claims, 8 Drawing Sheets

(58) Field of Classification Search
CPC ........... H04N 21/4307; H04N 21/4312; H04N 21/4334; H04N 21/458; H04N 21/23106; G06F 16/433; G10L 2015/088; G10L 15/08; G10L 15/22; G10L 15/00; G10L 21/003; H04M 1/6505; H04M 1/72522; H04M 1/7253; Y02D 70/20; Y02D 70/10; Y02D 70/14; Y02D 70/26; Y02D 70/144; Y02D 70/142; Y02D 70/1262; G11B 27/10; G11B 27/105

See application file for complete search history.

(56) References Cited

U.S. PATENT DOCUMENTS

| | | | | |
|---|---|---|---|---|
| 5,640,202 | A * | 6/1997 | Kondo | H04N 5/232 348/222.1 |
| 5,687,279 | A | 11/1997 | Matthews | |
| 5,903,868 | A | 5/1999 | Yuen et al. | |
| 8,208,670 | B2 | 6/2012 | Wright | |
| 8,218,941 | B1 * | 7/2012 | Dagman | G11B 20/10527 369/84 |
| 8,907,195 | B1 * | 12/2014 | Erol | G09B 5/06 84/609 |
| 2004/0042103 | A1 | 3/2004 | Mayer | |
| 2004/0109067 | A1 * | 6/2004 | Yokoi | H04N 5/23203 348/220.1 |
| 2004/0140898 | A1 | 7/2004 | Reeves | |
| 2005/0146990 | A1 | 7/2005 | Mayer | |
| 2007/0263668 | A1 * | 11/2007 | Lau | G10L 25/69 370/503 |
| 2008/0034400 | A1 | 2/2008 | Allen et al. | |
| 2008/0140238 | A1 * | 6/2008 | Rurup | G10H 1/0058 700/94 |
| 2008/0313481 | A1 * | 12/2008 | Paljug | G06F 1/3209 713/323 |
| 2011/0200220 | A1 | 8/2011 | Wright | |
| 2015/0065094 | A1 * | 3/2015 | Joung | H04L 65/80 455/412.1 |
| 2015/0181351 | A1 * | 6/2015 | Sarow | A44C 5/0015 381/334 |
| 2016/0292603 | A1 * | 10/2016 | Prajapati | G06F 3/165 |

OTHER PUBLICATIONS

Kapture: the audio-recording wristband, kickstarter.com, Oct. 2013, 10 pages. http://www.kickstarter.com/projects/1483824574/kapture-the-audio-recording-wristband.

* cited by examiner

LOW-POWER CONVENIENT SYSTEM FOR CAPTURING A SOUND

CROSS-REFERENCE TO RELATED APPLICATION

This application claims priority to U.S. Provisional Patent Application Ser. No. 62/442,821, entitled "Low-Power Convenient System for Capturing a Sound," filed Jan. 5, 2017, the entirety of which is hereby incorporated by reference for any and all purposes.

BACKGROUND

Despite amazing advances in technology, audio recording systems in modern times tend to be resource-heavy, confusing and cumbersome to use. Audio files tend to grow large very quickly and so consume precious computer storage. Frequently, really good audio is missed because the collection system is off. But when left on, the audio collection files become large and unwieldy. Large files are expensive in terms of processing and sending. Signal processing of audio data may also be needed, and tends to be expensive in terms of required processing capability and power consumed during processing. Large files are time-consuming to review and edit. Most audio data that is collected is not very interesting. Although computerized devices have been capable of audio capture for decades, it is very rare for personal audio to be collected or shared. Though audio is treasured, most people don't have a library of audio from their dearest people. Often loved-ones will cling to a last message that was left on a missed call recording-machine, because there is very little other audio that has been collected.

SUMMARY

Systems, methods and computer-readable media are provided for the low-power capture of sound. In particular, embodiments of the invention are directed to a computer-readable media that performs a method of automatically recording audio. An Audio source application operates on a first device and an audio sink application operates on a second device.

At the first device an audio segment size is defined. The user provides a command to the first device to begin collection of audio information. Audio is stored in a buffer area such as on-board RAM, while the amount of data stored in the buffer is monitored. The method continues to circularly write over the buffer area until an indication is received by the first device that recent data is interesting to the user. After the indication is received by the first device, a recently-stored record indicator is defined, and this information is used to define an end-of-capture record indicator. The first device then provides a segment of old audio before the indication was received that is up to the size of the defined audio segment. The amount of audio is maximized to give close to a full segment-size of available data. In some cases, there are samples that were not properly recorded, or the device had not been on long enough to get a full segment-size of data, or a processor limit was reached resulting in some data not being successfully stored. Such errors result in unavailable audio. The first device takes the available data in the buffer from the start-of-capture to the end-of-capture and automatically defines an audio file containing data derived from the audio samples within the interval. The captured audio that defines the file is then transferred to a second storage area such as an SD Card. After a file has been stored in a second storage area, a connection is established to the second device. The audio file is sent to the second device. The first device receives confirmation that the audio file was received. The first device disengages from data transfer to the second device after confirmation is received.

In an embodiment, a computerized system comprises a source device with a source application that wirelessly couples to a sink application on a sink device. The sink application comprises a settings component that receives user input that indicates an audio capture segment size. This audio segment size is subsequently communicated to the source application which defines an audio segment size within the source application. A receive component within the sink application receives one or more audio files by communicating wirelessly with a data transfer component in the source application. An annotation component within the sink application is capable of associating identifiers such as textual descriptions, photos, or audio descriptions of a received file. An initialization component with the source application begins capture of audio by storing audio incrementally in a buffer. A capture component within the source application monitors an amount of audio data stored in the buffer and receives a user indication that recent data is interesting to the user during the storing of audio data in the buffer. After the source component receives an indication that recent data is interesting a recently-stored record indicator is defined, and this is used to define an end-of-capture record indicator. Next the source app determines a start-of capture record indicator to provide maximum available data that is earlier than the recently-stored record indicator by an amount of samples that may be as large as the audio segment size. A data transfer component with the source application automatically defines an audio file containing data derived from audio samples from the start-of-capture record indicator to the end-of-capture record indicator; and transfers the audio file to a second storage area.

In this way, an embodiment provides memorable audio from the recent past for saving, annotating and sharing in a simple, low-power, and convenient method and system.

BRIEF DESCRIPTION OF THE DRAWINGS

The present invention is described in detail below with reference to the attached drawing figures, wherein.

DETAILED DESCRIPTION

Figure 1:
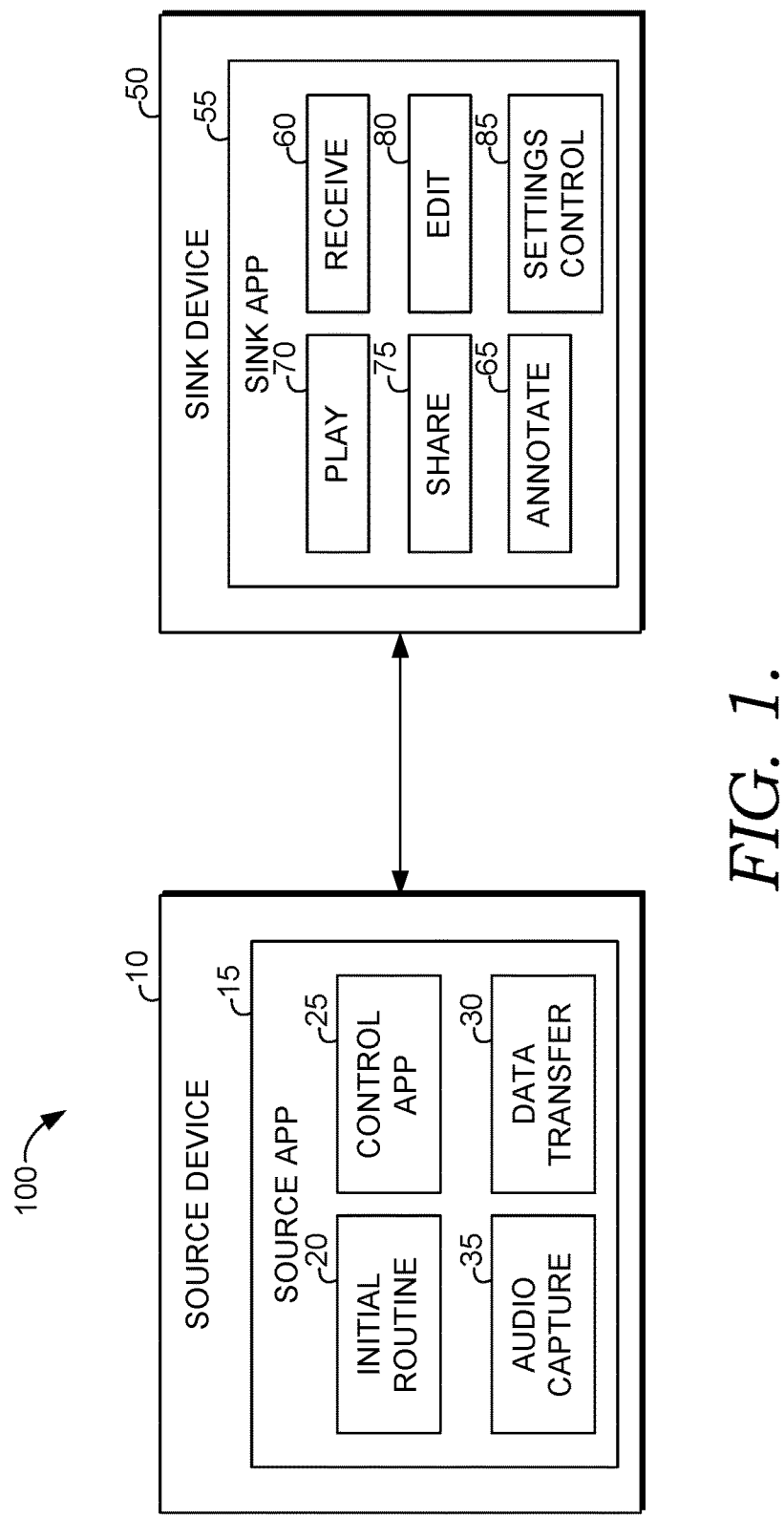
FIG. 1 depicts a representative software application component operating environment suitable for practicing an embodiment of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media.

Computer-readable media can be any available media that can be accessed by a computing device and includes both volatile and nonvolatile media, removable and non-removable media. By way of example, and not limitation, computer-readable media comprises media implemented in any method or technology for storing information, including computer-storage media and communications media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory, a memory card, a Secure Digital (SD) memory card, or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computing device such as device 210 or device 250. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Accordingly, at a high level, this disclosure describes, among other things, methods and systems, for capturing audio in a low-power wearable device. Referring now to the drawings in general, and initially to FIG. 5 there is shown an exemplary low-power wearable device in the form of a feature-enhanced wrist-watch 210. Other wearable low-power devices 210 include a pen, a glove, a pen-likeness, a tie-clip, a medallion, a necklace, a pin, a shoe, a belt, button, a broach, and a hat, for example. In operation within an exemplary operational environment 500, a wearer of device 210 sets a "listening" mode in which acoustic sounds are quietly being received through audio port 213 and are being sensed, digitized and temporarily buffered within device 210 at very low power, e.g. within an internal memory of a processor 220. A display 222 presents indicator 501 to indicate that device 210 is in an audio listening mode. In an embodiment indicator 501 is a small likeness of a microphone. Device 210 has predefined within it an audio segment size, e.g. 45 seconds. When the user wants to save something that was just heard, the user presses touch sensor 227, so that device 210 processes the last 45 seconds of audio (the predefined audio segment) incorporating the underlying data into an automatically defined audio file, which is transferred to a second storage area 240 such as an SD card contained within device 210. Over a period that may extend from hours to days, the user, when desired, pushes touch sensor 227, prompting device 210 each time, to save another audio file in like fashion. At some point after at least one file has been defined, a user can wirelessly transmit one or more audio files from device 210 to a second device such as 250, which receives the one or more audio files and presents them for use, review, annotation, sharing and storage.

By way of example and not limitation, an embodiment of the invention may be used to undertake capture of precious audio memories to be stored and used, and replayed within an audio library. Advantageously, the method avoids the "microphone fear" that often occurs when a person is placed in a notably strange environment to capture audio with a conventional system. In "microphone fear" the visible presence of audio equipment such as a conventional microphone causes the person to be tense, to say things awkwardly, to be overly analytical, to freeze, to go quiet, etc. Further, the search problem is mitigated by keeping audio files small, and allowing each to be individually annotated. Additionally, the device 210 is able to operate for an extended period of time collecting audio with minimal power usage and a modest amount of low-power memory. The device 210 operates to securely store audio content for long-term use in an automatically generated audio file format, and also to transfer one or more audio files to a second device 250 for additional annotation and further transmission for sharing the audio.

Turning now to FIG. 1 in particular, an aspect of a representative software application component operating environment 100 is provided that is suitable for practicing an embodiment of the present invention. We generally show certain items in block-diagram form to be able to reference components in a fashion that is consistent with the nature of a patent rather than to imply that a certain component is or is not part of a certain device. Similarly, although some items are depicted in the singular form, plural items are contemplated as well (e.g., what is shown as one data store might really be multiple data-stores distributed across multiple locations); but, showing every variation of each item might obscure the invention. Thus for readability, we show and reference items in the singular (while fully contemplating, where applicable, the plural).

A source device 10 is a device that captures audio data in a file and communicates with a sink device 50 that receives the file. In an embodiment the source device 10 is a wearable device shown also in device 210. In an embodiment source device 10 is a computer, tablet, or smartphone such as device 250, e.g. an iPhone. Source device 10 hosts source app 15 which is a software application program that operates on source device 10 to perform operations such as those used to initialize the source device for audio capture (component 20), perform audio capture (component 35), control the source app (component 25), and perform data transfer (component 30). Control App 25 receives user input and presents one or more menus to the user on display 222 allowing a user to select different operational modes of the source app 15 such as a "listening" mode, a "not-listening" mode, a "demo" mode, a "play" mode, and a "cancel" mode. Initialization routine 20 runs when the source app 15 begins to run, and in an embodiment checks to make sure that certain conditions are satisfied, e.g., that a sink device 50 has been identified to be associated with the source device 10 for eventual transfer of audio files, that an audio segment length has been defined, and that a buffer area is available for collection of audio data of length at least equal to the defined segment length.

In an embodiment, initialization routine 20 loads a default segment length and begins capture of audio into a buffer and waits for a command from the user to save audio that has just been heard. In an embodiment source app 15 is a microsequence controller that simply performs a sequence of data movements based on a program sequence. In an embodiment source app 15 is incorporated into the operating system of source device 10. In an embodiment source app 15 is a native application delivered with an operating system of device 10. In an embodiment source app 15 is an application downloaded from an application store such as the iTunes App Store. In an embodiment source app 15 is an application program that runs in an embedded system. In an embodiment other applications performing other functions also run in an embedded system of source device 10, e.g. a time-keeping application, a display application, a graphical user interface application, and a mode select application.

Sink device 50 is a device that receives an audio file from the source device 10. In an embodiment sink device 50 is a computer, tablet, or smartphone such as device 250, e.g. an iPhone. In an embodiment sink app 55 is incorporated into the operating system of sink device 50. In an embodiment sink app 55 is a native application delivered with an operating system of sink device 50. In an embodiment sink app 55 is an application downloaded from an application store such as the iTunes App Store. In an embodiment sink app 55 is an application program that runs in an embedded system. In an embodiment other applications performing other functions also run in an operating system of sink device 50, e.g. a digital message application, a web application, a social media application, an email application, a graphical user interface application, a settings application, and a media player application.

Sink device 50 hosts sink application 55 which is an application that receives audio files from source device 10. Sink app 50 uses one or more component software modules to perform operations related to the reception of audio files such as, a play component 70 that plays the audio in the file for the user of device 50; a receive component 60 that receives one or more files from source device 10; a share component 75 that attaches the audio file for communication to another device and/or user through a messaging system in a message such as a digital message, a text message, an email, a web post, etc.; an edit component 80 that allows the audio file to be modified to eliminate unsavory audio, or to add additional audio; an annotation component 65 that allows a more descriptive file name to be added, and/or a photo to be included with the audio file to form an item; and a settings control component 85 that provides a user with a mechanism to change the settings of source device 10 such as the defined audio segment.

Figure 2:
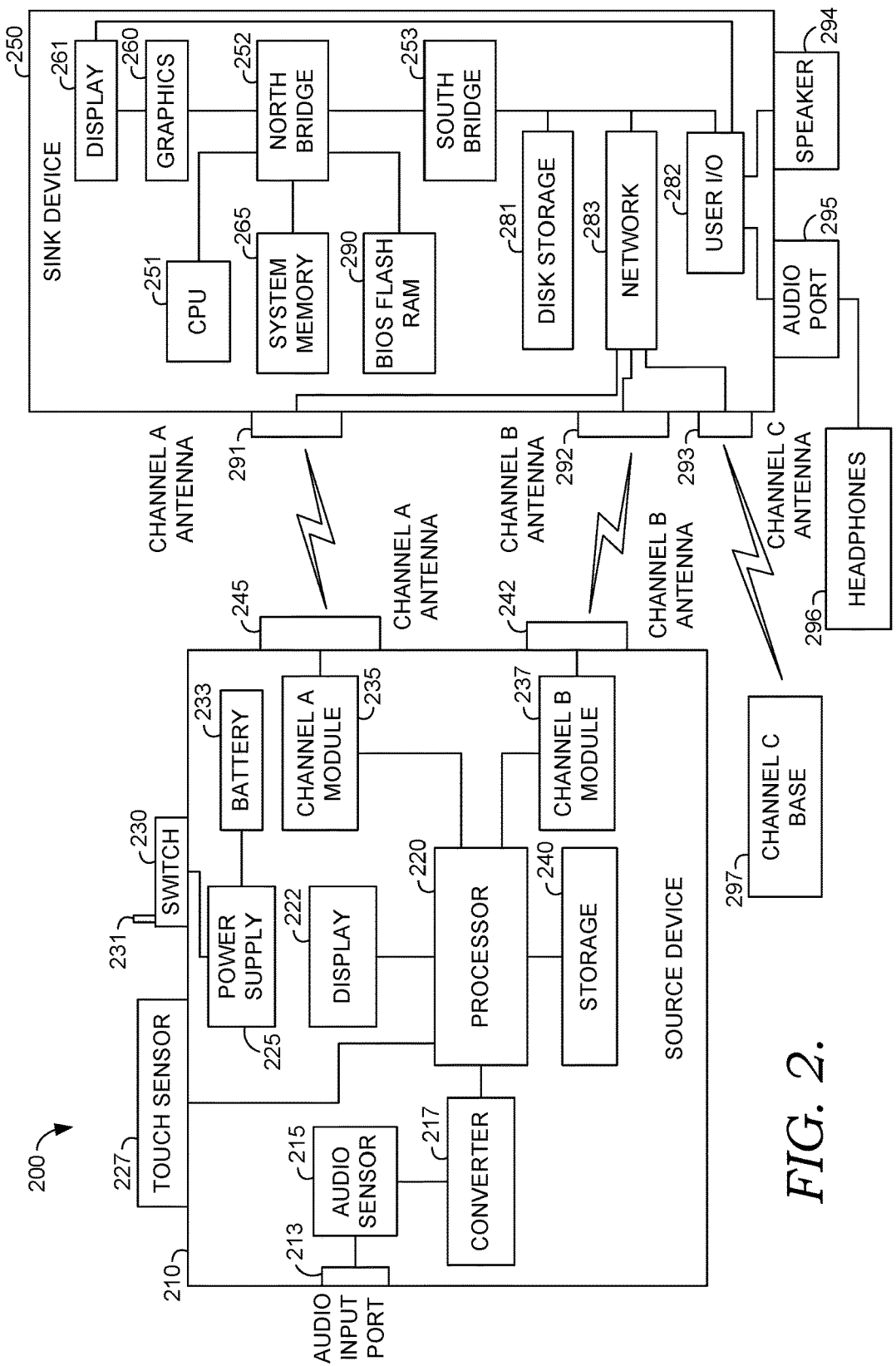
FIG. 2 depicts a representative hardware component operating environment suitable for practicing an embodiment of the invention.

Turning now to FIG. 2, there is shown a representative hardware component operating environment 200. Exemplary source device 210 receives acoustic waves through input port 213 and automatically defines and stores an audio file in storage 240. An audio file is transmitted, e.g. using channel A module 235 over channel A Antenna 245 to sink device 250 that receives the information at channel A antenna 291 and interfaces through network element 283 to CPU 251. In an embodiment channel A is a WiFi channel interface such as 802.11b/g/n operating at about 2.4 GHz or an 802.11ac connection operating at about 5 GHz. In an embodiment control data for device 210 is received and transmitted through channel A. In an embodiment an audio data file is transmitted using channel B module 237 through antenna 242 to sink device 250 that receives on channel B antenna 292 and interfaces through network element 283 to CPU 251. In an embodiment channel B is a Bluetooth interface such as Bluetooth Smart, Bluetooth 4.2, Bluetooth 4.0 or Bluetooth 2.1, or the like. In an embodiment, control data for device 210 is received and transmitted through channel B. Components 235 and 237 are appropriate link connection interfaces that are operative during the transmission or reception of data between devices 210 and 250. In an embodiment, components 235 and/or 237 are inoperative and in a low-power state unless there is a data file that has not been successfully transmitted from device 210. In an embodiment, after device 210 receives confirmation from device 250 that an audio file was received, device 210 disengages from data transfer to device 250, and changes components 235 and/or 237 to a low power state, e.g. by deselecting one or more chips. In an embodiment link processing is performed in processor 220 and channel modules 235 and/or 237 merely encode modulated data in a channel compatible format.

Device 250 stores a received audio file in storage such as disk storage 281, RAM 290, system memory 265, or internally within memory of CPU 251. An audio file is played on sink device 250 through audio port 295 to headphones 296, or through speaker 294. Sink device 250 sends an audio file through antenna 293 to Channel C Base 297. In an embodiment, Channel C Base 297 is a cellular carrier base station that provides digital messaging service and/or digital data service including Internet, and world-wide web. In an embodiment, digital data service on channel C is LTE. Sink device 250 has software instructions for storage of data and programs in computer-readable media. Sink device 250 is representative of a system architecture that is suitable for source device 10 and/or sink device 50. One or more CPUs such as 251, have internal memory for storage and couple to the north bridge device 252, allowing CPU 251 to store instructions and data elements in system memory 265, or memory associated with graphics card 260, which is coupled to display 261. Bios flash ROM 290 couples to north bridge device 252. South bridge device 253 connects to north Bridge device 252 allowing CPU 251 to store instructions and data elements in disk storage 281 such as a fixed disk or USB disk, or to make use of network interface 283 for remote storage. In an embodiment, network interface 283 includes network and link communications layer processing for end-to end communication of a network protocol employed. User I/O device 282, such as a communication device, a mouse, a touch screen, a joystick, a touch stick, a trackball, or keyboard, couples to CPU 251 through south bridge 253 as well. In an embodiment, a touch sensor incorporated into display 261 provides user I/O signals to CPU 251 through I/O device 282. The system architecture depicted in FIG. 2 is provided as one example of any number of suitable computer architectures, such as computing architectures that support local, distributed, or cloud-based software platforms, and are suitable for supporting computing system 50.

Device 210 shows physical switch 230 with toggle 231, which when selected turns on the source application 15, and some associated hardware, and when deselected turns off the source application 15 and some associated hardware. For example, in an embodiment, one or more of audio sensor 215, converter 217, storage 240, channel B module 237 and channel A module 235 are associated with the source application 15, and moved to a low power state when switch 230 is deselected. In an embodiment, the functionality of switch 230 and/or touch sensor 227 is incorporated into a graphical user interface in conjunction with display 222, which in such an embodiment also incorporates touch sensor 227 as an overlay over the display, thus performing switching functions through a graphical user interface rather than through a separate physical switch. In the embodiment shown in FIG. 2, touch sensor 227 is a physical switch, such as a momentary push-button switch.

Figure 5:
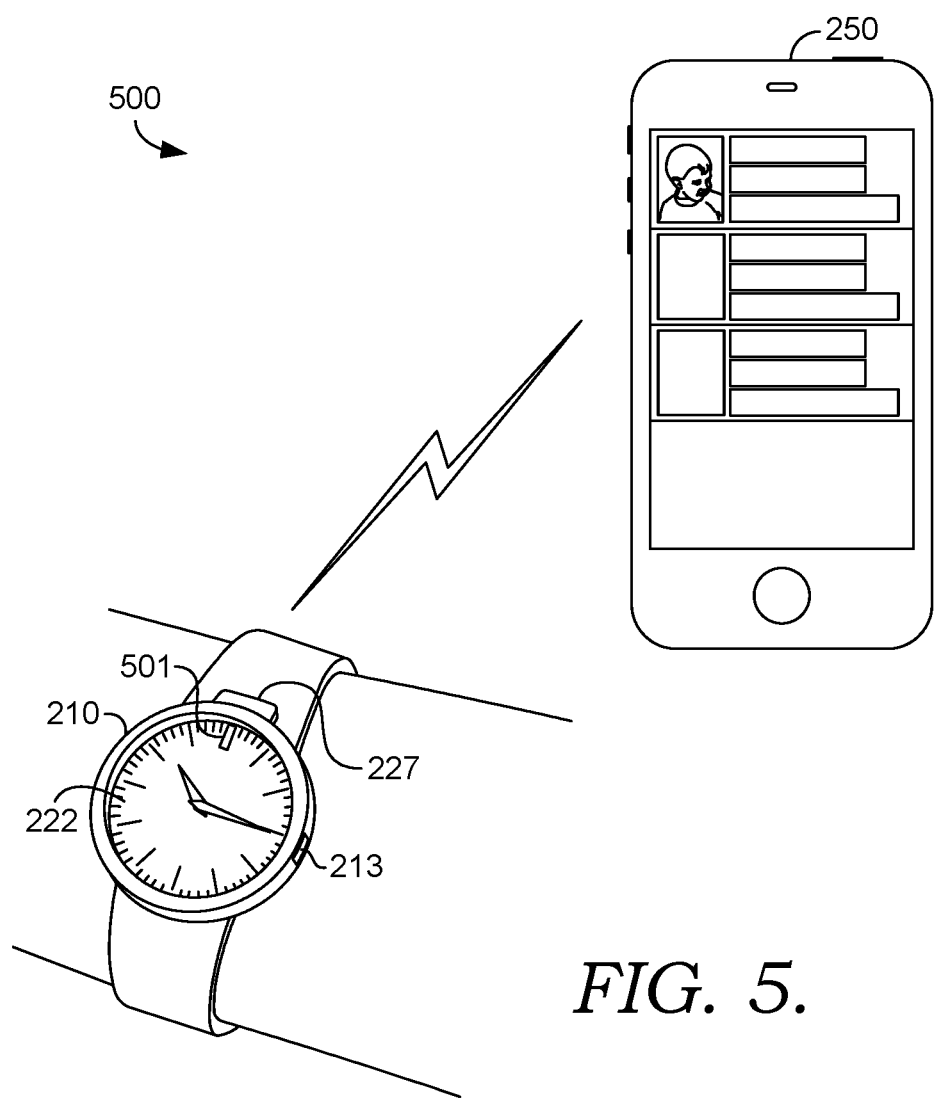
FIG. 5 depicts a representative device operating environment suitable for practicing an embodiment of the invention.

In operation a user selects switch 230 to the "on" state by moving toggle 231 from an "off" position to an "on" position. Power supply 225 supplies power to components within device 210. In an embodiment, power supply 225 includes one or more regulators such as TLV 7033 DDCT, and/or LM 2750 both manufactured by Texas Instruments. In an embodiment, power supply 225, based on the state of switch 230 regulates the application of battery 233 power to one or more components of device 210. In an embodiment, battery 233 is a rechargeable battery, such as a rechargeable button cell Lithium Ion battery. In an embodiment, a rechargeable battery is recharged by plugging into a physical recharging port on the body of device 210. In an embodiment, a rechargeable battery is recharged by placing the device 210 into a recharging cradle when not being worn. Audio sensor 215 begins sensing acoustic, or sound signals, and converting these to electrical analog signals that are sent to converter 217. In an embodiment, audio sensor 215 is a microphone component mounted to a printed circuit board, so that audio input port 213 consists of a hole in the surface of the watch body, as shown in FIG. 5, followed by a gasket that is seated between the watch body and the bottom side of the printed circuit board. The sound waves then pass through a hole in the printed circuit board to be received on a bottom port of a surface mount microphone device, such as analog MEMS device SPU0410LR5H-QB manufactured by Knowles Acoustics. In an embodiment, the hole on the PCB is larger than the hole on the microphone component but smaller than the solder ring on the MEMS component. Converter 217 receives the analog microphone signal and converts the information to digital form, and passes audio information in digital form to processor 220. In an embodiment, converter 217 is PMC1870 Manufactured by Texas Instruments. In an embodiment, converter 217 operates at least 8 bits of audio per sample at a rate of 44.1 kHz. In an embodiment, converter 217 converts 16 bits of audio per sample at a rate of 44.1 kHz. In an embodiment, digitized audio is passed between two or more components 217, 220, 235, 240, 237 of device 210 using a Serial Port Interface (SPI) data signal. In an embodiment, digitized audio is passed between two or more components 217, 220, 235, 240, 237 of device 210 using an inter-IC Sound Bus (I2S) data stream. Digitized audio is received by processor 220 from converter 217 and is stored in internal or external memory storage, such as RAM, in one or more buffers. In an embodiment, processor 220 is low power micro-controller, such as MSP 430 F5528 manufactured by TI. In an embodiment, storage 240 comprises a miniature digital memory media, e.g. CompactFlash, SmartMedia, MMC, MMCmicro, Secure Digital (SD), miniSD, microSD, Memory Stick, xD, XQD card.

In an embodiment, device 210 continues to write audio samples to RAM in a circular buffer section of one or more banks and, absent a signal from touch sensor 227, device 210 writes over previous audio data in the circular buffer. While writing data to a buffer, the storage process is monitored by keeping track of the position of a current sample of audio that is being written within the circular buffer. For example, a currently active bank and/or index within a bank could be monitored by maintaining a register that stores the currently active bank and index within a bank.

In an embodiment, the system implements a DMA buffering technique to allow saving audio data to a Secure Digital (SD) memory card in a method which alternates between two random access memory (RAM) buffers. While one buffer is filling with data the other buffer is being saved to the SD card. The more RAM available, the faster the data rate that can be handled. The RAM buffer filling time allows for other mechanisms to check data integrity. In an embodiment, device 210 uses a circular buffer method for storing the audio recording data over a certain period of time. The method sets a number of desired minutes of recording into recorded segments. When it is requested by the user to save the latest recording, the system concatenates the recording files to save the given number of minutes previously recorded. The advantage of this method is to limit the size of storage required on the SD card while only saving the previous recorded segments necessary for the desired recording time.

Figure 6:
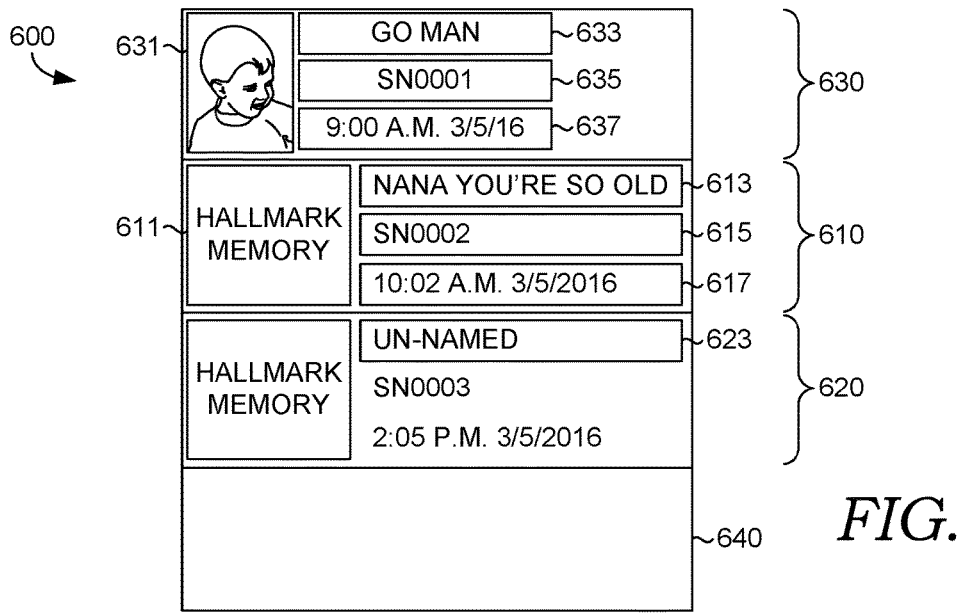
FIG. 6 depicts a representative home graphical user interface for a sink application suitable for practicing an embodiment of the invention.
Figure 7:
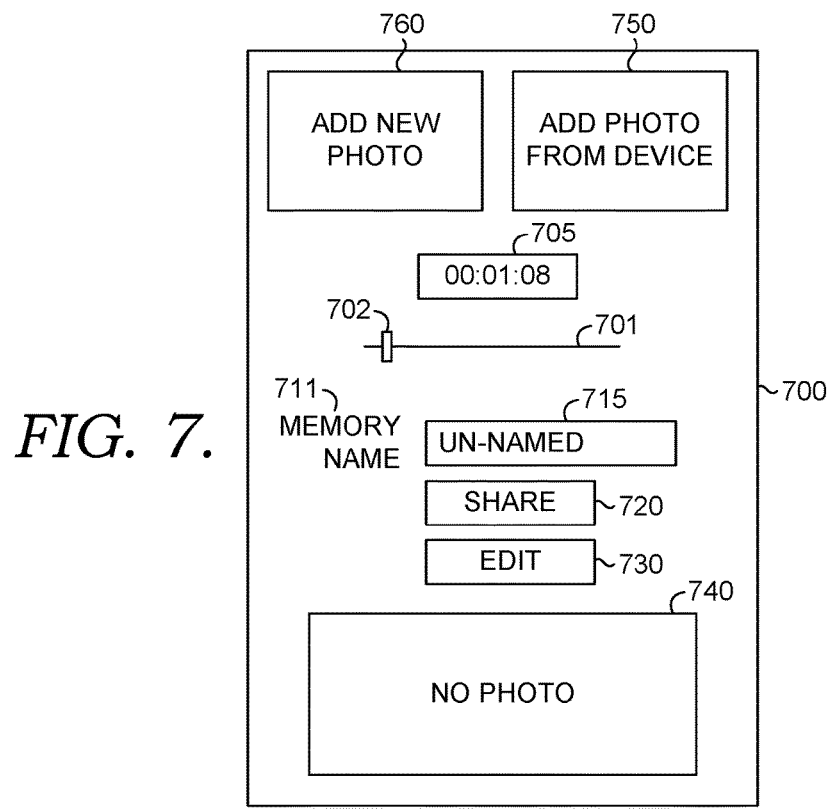
FIG. 7 depicts a representative item editor graphical user interface for a sink application suitable for practicing an embodiment of the invention.
Figure 8:
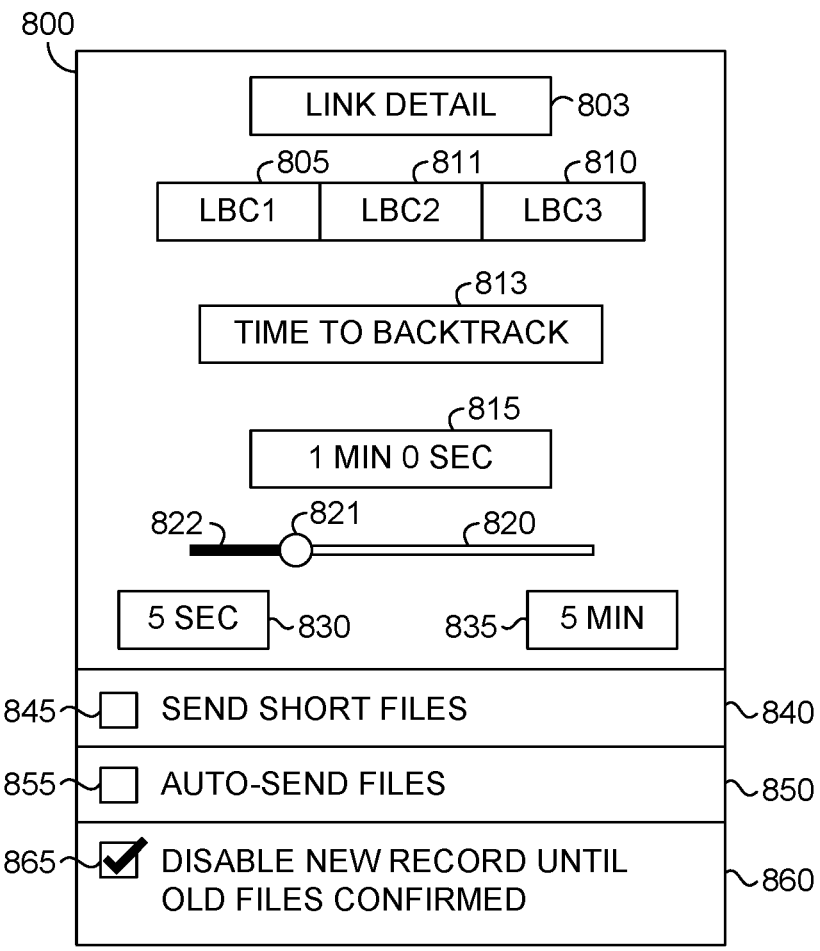
FIG. 8 depicts a representative settings graphical user interface for a sink application suitable for practicing an embodiment of the invention.

In an embodiment, display 222 is a watch screen implementing Memory LCD Display technology such as LS013B7DH06 manufactured by Sharp, Inc. In an embodiment, display 222 displays conventional bitmap images. In an embodiment, images used are 128 bit by 128 bit format with 1 bit color resolution. In an embodiment, a display image is inverted and rotated by a photo editor, and then saved on the system memory in storage 240, e.g. an SD card, to be displayed with proper orientation on display 222. In an embodiment, the images are prepared in a necessary format such as bit-map, JPEG, PNG, or GIF. In an embodiment, the images are saved in storage 240, such as within an SD card as conventional FAT files and are called by a device operating program such as source app 15 when needed. In an embodiment, images are shown on the display rapidly to provide animated imaging. In an embodiment, a monochrome 128×128 bitmap file is displayed without the need to edit and prepare an image. In an embodiment, conversion, when necessary, is performed on device 210 and saved in storage 240, e.g., an SD card for use by device 210. In an embodiment, images are rendered on display 222. In an embodiment, a display 222 shows graphical user interface elements, such as: a control 760, 750, 702, 701, 715, 720, 730, 631, 611, 623 (FIGS. 6 and 7); an information box 633, 635, 613, 615, 637, 617, 803, 815, 813, 830, 835 (FIGS. 6 and 8); an active area 610, 620, 630 (FIG. 6); a selection box 845, 855 (FIG. 8); a confirmation image 865 (FIG. 8) that confirms a selected option 840, 850, 860; a labeled selection tab 805, 811, 810; and a selection indication 702, 705, 815, 822, 821, 820, 633, 613, 740 (FIGS. 6-8).

Figure 3:
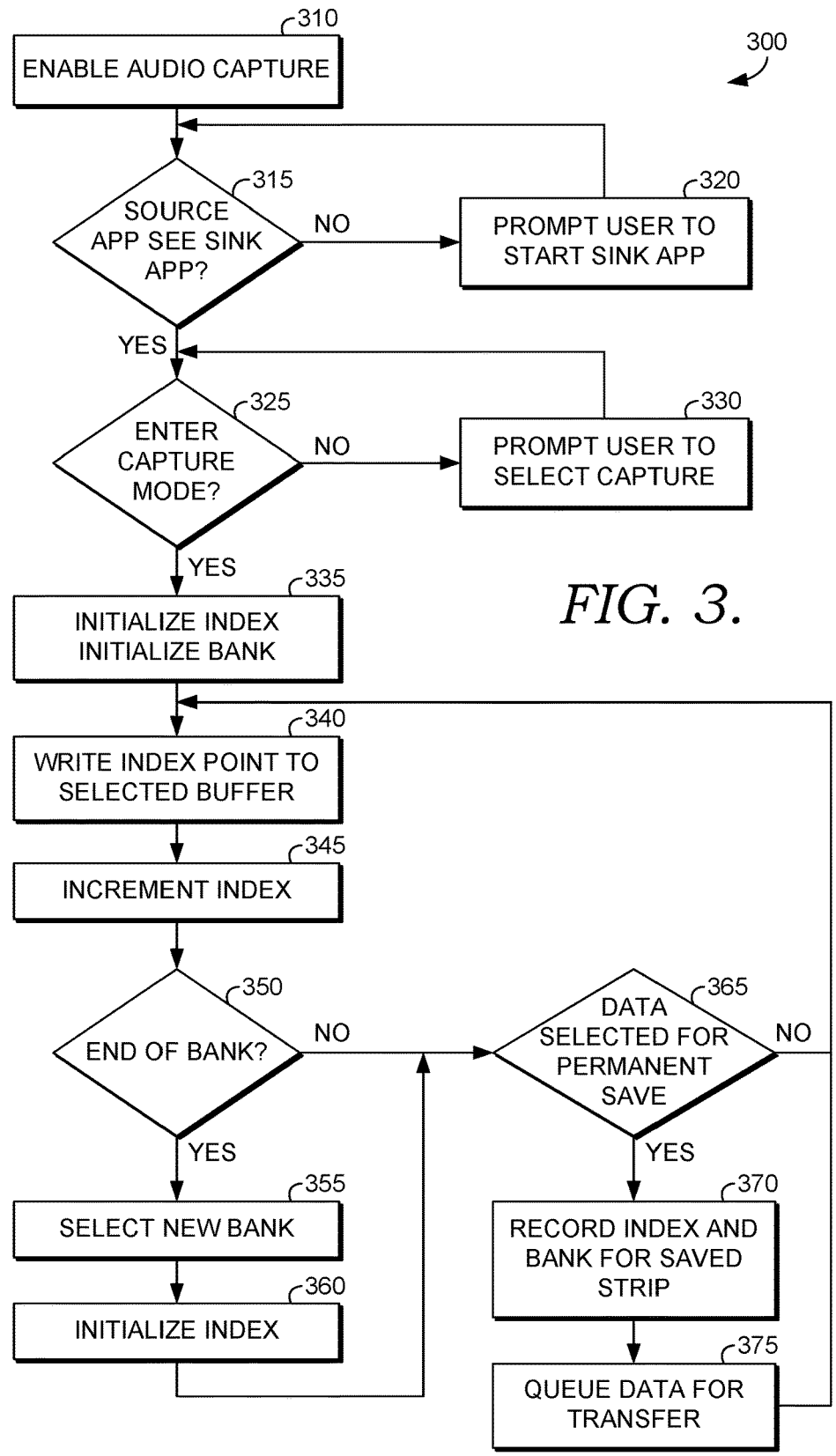
FIG. 3 depicts a representative flow diagram of a method for identifying a set of audio data for practicing an embodiment of the invention.

Turning now to FIG. 3, there is shown in 300 a representative flow diagram of a method for identifying a set of audio data. At 310, device 210 enters an audio capture mode, e.g., when a toggle 231 is moved to the "on" position, and a source app 15 is invoked by device 210, which in turn invokes an initialization routine 20. In an embodiment, one or more banks of storage that constitute a buffer are initialized with "quiet" audio values that have the effect of providing quiet audio output if a memory area is read that has not successfully received a write operation of audio data. In an embodiment a low amplitude signal is alternated between small positive and small negative to provide a "quieting" signal.

In an embodiment, after capture has been enabled, at 315 a test is performed to see if a source application 10 can "see" a sink application 50. It is advantageous, prior to audio capture for a source application 15 to pair with a sink application 55 and/or an associated sink device 50. Such a pairing may set a user at ease, knowing that the link from source device 10 to sink device 50 is operational, and that any audio captured will go to sink device 50 and not to an unintended device. In an embodiment, a device-specific identifier is recorded within each of source app 15 and sink app 55, and these identifiers are displayed to a user on a device 10 to confirm, by displaying the identifier of sink app 55 on source device 10 that the pairing available is a desired pairing. In an embodiment, accept and reject menu items are displayed on display 222, prompting a user to select one of the displayed menu items. In an embodiment, touch sensor 227 is used to select items on a menu displayed on display 222. In an embodiment, if touch sensor 227 is depressed for a short period of time, e.g., less than 0.5 seconds, the display toggles between available menu items. If touch sensor 227 is held for a longer period of time, then the highlighted menu item is activated. In an embodiment, at 315 the test of whether or not the source app sees the sink app includes, prior to offering a pairing option for selection to a user, presenting a prompt message at 320 to initiate pairing, such as an instruction screen that says "Open sink app and press the button when it is ready", and the method returns to 315. The initial component 20 then continues in a wait loop looking for activation of touch sensor 227. The user then opens sink app 55 on sink device 250, and when user is satisfied that sink app 55 is operating as instructed, user activates touch sensor 227. The initialization app 20 then performs pairing operation.

In an embodiment, at 315 a user selects one or more settings of a source app 15 such as a value of audio segment size to be used. In an embodiment, settings for source app 15 are set by a user interface on source device 10. In an embodiment, settings for source app 15 are set by a user interface on sink device 55, and then these settings are communicated to source app 15, which stores setting values, thus defining various settings of source app 15 for data capture. A representative settings graphical user interface 800 shown in FIG. 8 allows a user of sink device 50 to select a value of audio segment size. Information box 813 describes the audio segment size with an appropriate label such as "time to backtrack". Information box 815 displays for a user a currently selected time to backtrack, such as "1 minute and zero seconds." In an embodiment, field 815 is a control that allows a user to select the field, and type in a series of integers to set an audio segment size. In an embodiment, slider control 821 is manipulated through a pointer mechanism, such as a touch and drag of slider control 821. When moved to the left, the graphical display 822 is shortened, which indicates relative size of time to backtrack relative to a minimum backtrack time shown in information filed 830. When the slider control 821 is moved to the left the graphical display 820 lengthens indicating additional unused capacity for buffering. Similarly slider control 821 is touched and dragged to the right lengthening the audio segment size setting to a max value such as 5 minutes, as shown in information box 835, in the embodiment depicted in 800. In an embodiment, labeled selection tabs 805, 811, 810 allow a user to select different banks of settings or different control options to be set for source app 15. For example, when tab control 805 is selected label, LBC1 is shown in reverse video indicating that the current sheet of controls are from the first label category LBC1, such as "capture parameters." In an embodiment, information field 803 changes to indicate the category of settings chosen, such as "link detail" for the currently displayed settings screen. LBC2 and LBC3 similarly offer other settings to be controlled such as file format, item details, home screen options, data link options, etc. In an embodiment, a number of graphical controls 845, 855, 865 are presented for corresponding setting options 840, 850, 860. A control such as 845 shows that the setting option has not been selected and so is not currently active. A confirmation image such as 865 shows that setting 860 is currently active. In the exemplary embodiment shown setting 840 causes the source app 15 to send small, non-overlapping files, so that if touch sensor 227 is touched after entry into a capture mode three times: at 10 seconds, at 3 minutes, and 3 minutes 5 seconds, three files will be sent, the first: 10 seconds long, the second: one minute long and the third: 5 seconds long. If the sending of short files is disabled, then a full minute of audio is collected for each file. In an embodiment, the audio overlaps over previous audio capture, or even over an old buffer. In an embodiment, setting 850 permits data to be sent as soon as they are available for transmission, thus enabling auto search and acquisition of a wireless channel for transmission. When selector 855 is deselected, as shown, device 10 remains in a low-power mode with all wireless communications disabled until a user of device 10 selects a send option, at which time a wireless channel connection is formed, and unsent files are transferred to a sink device 50, and confirmed as received. When all files are confirmed received by device 50, the wireless connection is disabled, and source device 10 is returned to a low power state in which wireless communication is not enabled. Setting 860 enables a mode which prompts user to send files when a memory limit is reached, such as all available banks are full of data to be transferred. When 865 is deselected, a device 10 continues buffering data and transferring files to storage without requiring user input to transfer old files before a new file is stored. In an embodiment, an "auto-start" setting such as 860 controls whether or not a prompt is required to enter capture mode. When selected, a source device 10 automatically begins capture as soon as a device 10 enters capture mode, e.g., by the selection of toggle 231 on switch 230 to an "on" state.

Returning to FIG. 3, at 315 settings such as audio segment size, identified sink app, "auto-start", "send short files" are defined, or recorded in device 10 storage 240 for use during the operation of a source app 15 during operation of a capture component 35. In an embodiment, default definitions are made during a factory initialization enabling out-of-the box audio capture before any pairing or setup is performed, so that once audio capture is enabled at 310, the existence of the default definitions from a factory initialization at 315 enables the method to proceed to enter capture mode at 325 and to begin data capture procedures at 335. In an embodiment, the audio segment size is defined to be an integer number M of samples at the audio sampling rate. For example, a mono audio sampling rate of 44.1 kHz with a segment size of one minute results in M=2,646,000.

In an embodiment, at 325 a test is performed to see if a listening mode is currently active, and if so the method proceeds to 335. If a listening mode is not currently selected, at 330 a menu is displayed on display 222 providing options such as: listening, not listening, transfer files, settings, demo, cancel; and the method returns to 325. In an embodiment, a user selecting the cancel option, returns the device 10 to the beginning 310 of source app 15. In an embodiment, the demo option, when selected, provides a series of explanatory images describing the basic function of device 10, each successive image timed, or in an embodiment, advanced by the selection of touch sensor 227. In an embodiment, the settings option, when selected enables a user of device 10 to modify the settings on device 10. In an embodiment, the not listening mode, when selected keeps the source app 15 running, but disables audio buffering until selection of touch sensor 227, which redisplays the menu showing that currently, the not-listening option is selected. In an embodiment, the listening option, when selected causes the audio capture component 35 to be invoked and audio to be captured in a buffer that will contain past values of audio, and the method proceeds to 335.

Source app 15 receives a command to begin the collection of audio information. This command may come as a result of toggling switch 230 to an active state, or by power up of device 210, or by verification of sufficient data available to begin audio capture, such as a defined audio segment in the storage of device 10. At 335 audio information begins to be collected incrementally in a series of one or more banks 410, 420, 430, 440 that constitute a buffer, as depicted in storage arrangement 400 depicted in FIG. 4. A logical segment of storage memory, e.g., bank 420 denoted Bank 1, stores samples that are collected by converter 217 sequentially, so that the first sample of audio collected after activation of audio capture goes into storage location 421, a second sample goes into storage location 422, and so on, until the capacity of the memory segment is reached in the last sample 424 which is denoted N. For example, with a 44.1 kHz sampling rate, with a bank size of one hour, N=158,760,000.

Figure 4:
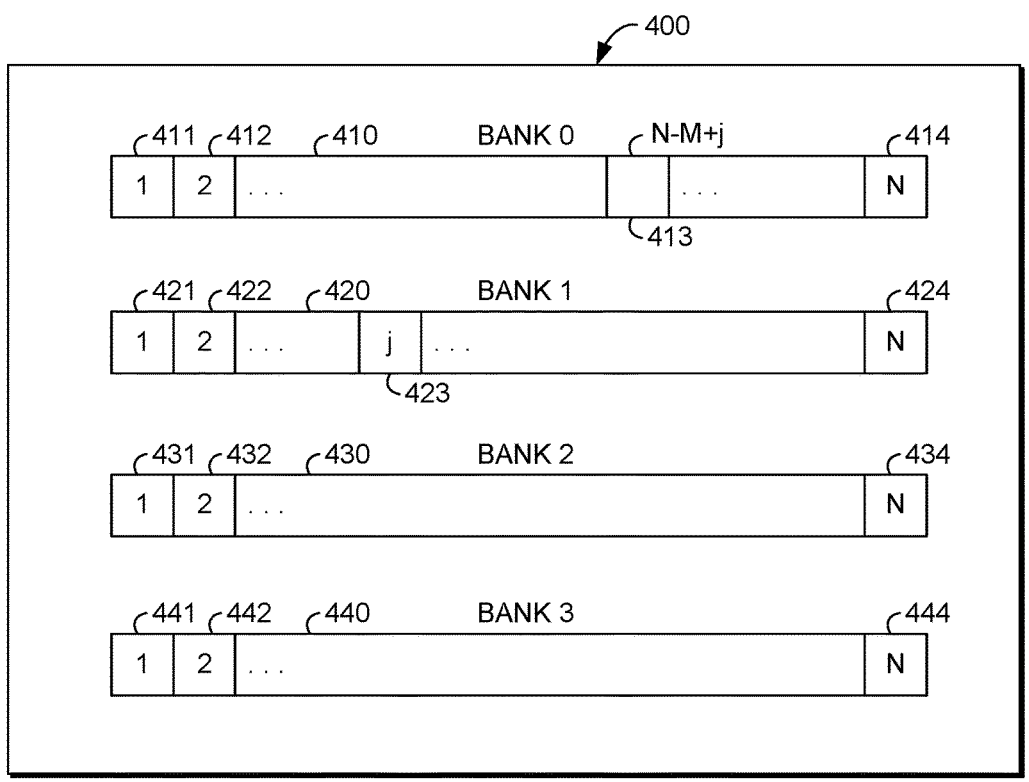
FIG. 4 depicts a representative storage management arrangement suitable for use in identifying a set of audio data for practicing an embodiment of the invention.

In an embodiment, a single bank 420 is used to incrementally store data using bank 420 as a circular buffer. After the last sample is written into bank 420 at storage location 424, the storage process returns to write a next sample into storage location 421 replacing an old sample. In an embodiment, two or more banks are used in succession to form in aggregate a circular buffer. For example, if bank 410 is a first bank, then storage begins at location 411, followed by location 412 and so on. After writing the last sample in bank 410 at storage location 414, the next sample written is to the succeeding bank such as bank 420 at location 421. In an embodiment, any number of banks can be utilized, the example of FIG. 4 showing four banks. In a four bank example, after writing sample 424 in bank 420, the storage method incrementally stores at location 431, then at location 432 in bank 430 and continues storing in bank 430 until the last sample is written at location 434, at which point the next location is location 441 of bank 440, followed by location 442. After the last sample in the last bank, e.g., sample 444 is written to bank 440, the method returns to the first bank in the list, e.g., sample 411 of bank 410.

In an embodiment, an index number keeps track of which sample within a bank should be written to next, and a bank number keeps track of which bank within a buffer should be written to next. The amount of audio data stored in bank 420 is monitored by keeping track of the last sample of audio to be recorded in a buffer. For example, a last sample location register k, and a last bank location register m monitor respectively the last sample index number and the last bank number used in storing the last sample written, e.g. to location 423 within bank 420. In this example, register m=1, and register k=j, but with a four bank example, m could in general be any bank number, providing a set of unique bank numbers up to the number of unique banks used, e.g., 0, 1, 2 or 3 for a four bank example. In a two bank example, the value of bank number in register m could be 0 or 1.

Back at FIG. 3, at 335 the incremental storage of audio begins by setting an index number to 1, and a bank number to 0. At 340 a sample of audio is stored at the location pointed to by the index number and the bank number. In an embodiment, a first sample of audio is written to location 411, after the sample is stored, register k is set to 1, and register m is set to 0, indicating that the last sample has been written to location 411. At 345 the index number is incremented so that the index number is now 2. At 350 a test is performed to see if the current index number has gone beyond the end of a bank, that is, if the index number is greater than N. In an embodiment, N is much larger than 2, so the method proceeds to 365 where a test determines whether or not data has been selected by a user for permanent save (has a user indicated that recent data is interesting by pressing touch sensor 227). If no, then the method returns to 340 where a second sample is written, but this time to location 412, because the index number is 2, and the bank number is 0.

While the system remains in a condition where there has been no indication of data selection for permanent save, the method continues storing within a bank 410, until at 345 the index number is incremented to N+1, at which point, at 350 the end of bank test becomes true, and then a new bank is selected at 355. In the present circumstance with two or more banks used, the bank number is incremented, and a test is performed to see if it is equal to the number of banks available. If the incremented bank number is not equal to the number of banks, than the incremented bank number becomes the new bank number, in the present example 1, otherwise the bank number is set to the first bank (here 0). The bank selection at 355 is modulo the number of banks used, so that after bank 1 is full in a two bank example, the bank number reverts to zero. Likewise, with a four bank example, after the bank number of three, when the bank is full, the bank number reverts to 0. At 360 the index is initialized by setting the index number to 0, and the method continues to fill a circular buffer at 365 to consider whether or not device 10 has received a user-indication that recent data is interesting.

When an event occurs, such as source app 15 receiving a user-indication that recent data is interesting during the storing of audio data in one or more banks that constitute a buffer, at 365 the method for identifying a set of audio data proceeds to 370. Source app 15 receives such an indication, for example, when a user activates touch sensor 227, processor 220 receives a signal resulting from a user indication that recent data stored in the circular buffer is interesting. Source app 15 then defines a recently stored record indicator, which is an indicator for the buffered sample that is approximately equal in time to the time that touch sensor 227 was selected. A recently stored record indicator Ir, in an embodiment, comprises the value of a last sample location register k, and/or the value of a last bank location register m. In an embodiment a record indicator comprises an index number and a bank number. In an embodiment, the recently stored index-indicator is defined to be a pair of register values (Vk;Vm) corresponding to the value of the index location register and the value of the bank location register respectively. For example, when the sample index is at three minutes within bank 420, a sampling rate of 44.1 kHz, at a sample number of 7,938,000 within bank 420, Ir=(Vk,Vm) =(7,938,000;1). In an embodiment, a recently stored record indicator comprises one or more of a pointer value, an index to a pointer, and a value that is nominally a predetermined number of samples away from an index number. Examples of a predetermined number of samples include, a number of samples approximating a reaction time of a user.

At 370 an index and/or bank are saved to define an end-of-capture record indicator Ie. In an embodiment, an end-of-capture indicator is defined to be the recently-stored record indicator, Ie=Ir. In an embodiment, the device 410 continues capturing audio data to the end of the current bank, so that Ie=(N;m). In an embodiment, the end-of-capture indicator comprises a value that is nominally a predetermined number of samples before or after the recently-stored record indicator. Examples of a predetermined number of samples include a number of samples approximating a reaction time of a user.

At 370, an nth strip Sn audio is defined beginning at some point in a buffer terminating in the sample identified by the end-of-capture indicator. For example, the first strip S1 of audio is defined the first time after buffering begins that a user touches touch sensor 227. An audio strip S1 consists of one or more sub-segments of audio, e.g. Seg1a, Seg1b, Seg1c, etc. such that when the segments of audio are concatenated together the resultant audio provides maximum available data content that is earlier than the recently-stored record indicator by an amount of samples up to the defined audio segment size. That is, the concatenated audio provides largely continuous data from the buffer up to the defined audio segment size earlier than the recently-stored record indicator. A sub-segment of audio consists of an indicator for the beginning of the segment, and an indicator for the end of the segment. In an embodiment, a defined strip of audio includes an integer at the beginning of the list, followed by a sequence of endpoints of sub-segments. In an embodiment, a defined strip comprises a sequence of endpoints of sub-segments (beginning endpoint followed by ending endpoint), and a string termination string (e.g. #) at the end of the strip definition.

For example, with a single bank circular buffering example, the audio segment size M, the recently-stored record indicator is j, and the buffer size N, with M<<N. In an embodiment, four banks are available, but the data is being buffered circularly in bank 420. If j>M, then S1 consists of a single strip S1=seg1a, where the beginning of seg1a is (j−M;1), and the end of seg1a is (j;1), therefore S1=1,(j−m;1),(j;1). If on the other hand j<M, then segment S1 consists of two strips S1=seg1a concatenated with seg1b, where the beginning of seg1a is (N−M+j;1) and the end of seg1a is (N;1), the beginning of seg1b is (1;1), and the end of seg1b is (j;1), therefore S1=2,(N−M+j;1),(N;1),(1;1),(j;1).

In an embodiment, at 370 data is queued for transfer by recording a list of strips ready to be transferred. In an embodiment, a list consists of one or more strip descriptions followed by a list terminator, such as a special character, e.g. "%". An exemplary list of three strips is S1;S2;S3%. In an embodiment, at 375 a new strip is added to a strip list, and a new bank is selected (e.g., bank 0), the index is initialized to 1, to begin filling a bank from the beginning, and a transfer component 30 is notified that a strip is available for transfer, and processing returns to 340. Alternation between banks has the advantage in some systems, e.g., systems with separately addressable banks of RAM, that while new data is being written to bank 0, bank 1 can be simultaneously accessed for transfer of audio data to a different storage location such as an SD card and/or to a different format for re-play or for transmission.

In an embodiment, at 375 one or more strips of data are transferred within device 210 from a first storage area, e.g., one or more banks of RAM within processor 220, to another storage device such as storage 240. In an embodiment, one or more sub-segments are automatically concatenated together in storage area 240 to form a single file of data for transfer. In an embodiment, a file list is maintained of files collected. In an embodiment, each file record in a file list comprises one or more of the location of the file, the size of the file, the format of the file, an automatically generated unique file name, the date and time that the file is created.

An embodiment sets up the bank size N to be equal to the defined segment size M, thus predefining the start-of-capture record indicator to be the succeeding sample after the end-of-capture record indicator. In this embodiment, the only data necessary for transfer of a buffered segment is some kind of indication of the last sample stored, or equivalently the oldest sample stored, such as an indicator of the last sample stored and the bank number Ie=(j;1). The data transfer operation then begins at (j+1;1) and ends at (N;1), and concatenates data from the beginning sub-segment that begins at (1;1) and ends at (j;1). But only a single pair of integers need be passed to a data transfer component 30 in a strip list. Upon recognition at 365 that old data is interesting an index number is set to 0 and a bank number is set to be different than the current bank number, thus the data in the current bank is frozen at the stored location, and a new bank will be used when it is time to store a sample.

In another example, illustrated in FIG. 4 where bank 410 and bank 420 together constitute a first circular buffer, among four available banks of data, at 365, when the end-of-capture record indicator has been defined to be Ie=(j;1), and M>j, the method first defines the index number to be 1 and the bank number to be 2. The strip definition is then S1=2,(N−M+j;0),(N;0),(1;1),(j;1).

In an embodiment, when j<M, the segment defined begins at the beginning of the bank rather than wrapping around to the end of a bank. That is, in an embodiment, the segment is defined to be S1=1,(1;1),(j,1). Such a definition, which results in files that are shorter than the defined segment length M provides an advantage in some circumstances. For example, when two segments are requested to be saved in rapid succession, a second save request is made before there is enough data to fill the defined size of audio segment. In this circumstance, a shorter file will provide successive saves to provide only new data, and not to "bleed in" any data from the end of a bank that may be very old, or may consist of "quiet," or default data. Such a short file option can advantageously be controlled by a setting control 845.

Figure 9:
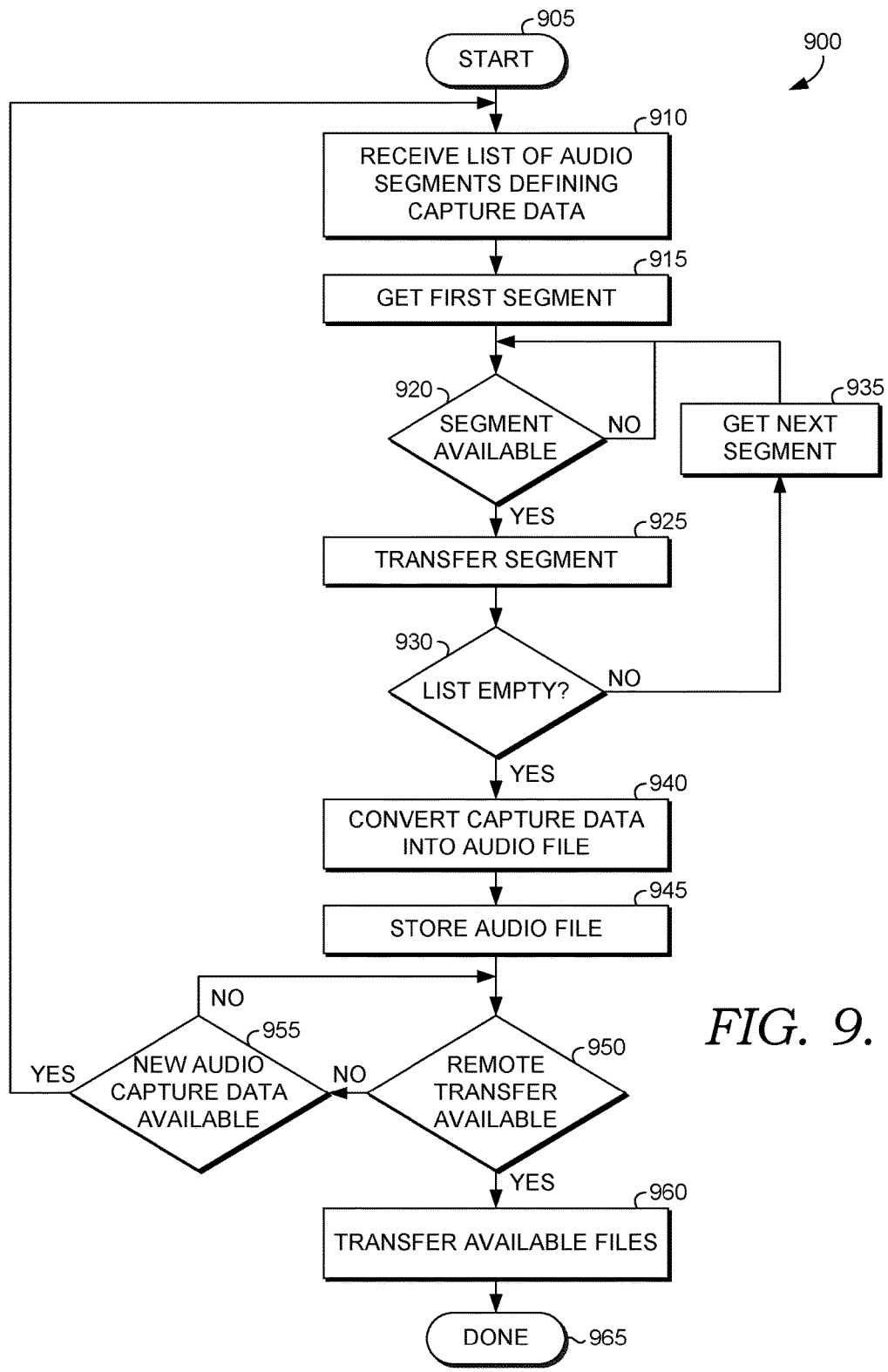
FIG. 9 depicts a representative flow diagram of a method for transferring audio data for practicing an embodiment of the invention.

Turning now to FIG. 9, there is shown in 900 a flow diagram of a method for transferring audio data. At 905 the method of transferring data begins when one or more strips have been identified. The discussion below describes particularly the application of the method for transferring two implicit segments in a single bank circular buffer. Extension to other cases considered within this disclosure is contemplated. In an embodiment, the method is invoked at 905 by a capture component 35 that invokes a transfer component 30 to carry out the transfer of audio data. At 910 a transfer component 30 receives a list of one or more audio segments that define data which has been captured. In an embodiment, an end of capture indicator identifies two segments implicitly, so that, e.g., transfer component 30 receives Ie=(j;1), implying S1=(j+1;1),(N,1) and S2=(1;1),(j;1). At 915 a first segment is obtained from a first memory location, e.g., transfer component 30 loads the first segment S1=(j+1;1), (N;1). At 920 a check is made if the segment is available. When a data bank cannot yet be read, the method cycles in state 920 checking for bank availability. When the bank containing the strip becomes available the method proceeds to 925 in which a segment is transferred from a first storage location such as a RAM bank within processor 220 to a second storage location 240, such as an SD card. At 930 the method tests to see if the list is empty. In the present example, a second strip to be concatenated is S2=(1;1),(j;1). When the list is not yet empty, the method obtains the next segment at 935 and returns to 920. In this way, the method exits 930 when a complete set of audio data has been assembled within storage 240. In an embodiment, at 940 captured data is converted into a formatted audio file. In an embodiment, a formatted audio file is an Audio Interchange File Format (AIFF).

In an embodiment, the audio file is saved to flash memory. The AIFF allows for the data to be saved in the byte order that is presented by an on-board encoder, e.g., within processor 220. In an embodiment, an I2S standard file stream which is set for 16 bits is handled as 8 bit data at the file saving process. This requires that the format is saved in the correct byte order (big endian or little endian) required for the desired file format. When using the AIFF format the byte order sent from an audio encoder does not need to be changed during data processing and storage, allowing for faster data throughput. The AIFF file format is easily readable on a personal computer, tablet, or smart phone, such as device 250. This method provides the advantage of increasing the speed of data capture. In an embodiment, an audio file is stored in a format such as PCM, ALAC, ALS, G.722.2, G.726, wmf, aif, aifc, mp3, etc. In an embodiment, a sampled audio stream is compressed, and the compressed file is listed as available for transfer. In an embodiment, the processor 220 operates at low power to perform a file compression operation, and after operation is complete, a file is listed as available for transfer.

At 945 the audio file that has been automatically defined derived from audio sample data from a start-of-capture record indicator to an end-of-capture record indicator is transferred to a second storage area within storage 240, such as a secure digital card file storage in storage 240.

In an embodiment, the audio recording data is saved to an SD card using a standard FAT file storage method. During the file storage of data the standard storage method is to allow the SD card system to provide a confirmation of the successful saving of each data block. In an embodiment, device 210 uses a method to allow a maximum time to receive the confirmation indicator. If that confirmation is not received the file saving system simply times out and moves on to save the next block. In practice the data block is usually saved successfully and no data is lost. This method overcomes gaps in saved data that would be missed while waiting for the SD card to respond with its confirmation.

At 950 a determination is made about the availability of remote transfer. In an embodiment, remote transfer may be disabled through system controls, or through congestion of a wireless link, or by distance from a sink device 250, or by the selected mode of a sink device 250. If transfer is not available the method proceeds to 955 where a test is performed to determine whether or not new audio capture data is available for conversion to a file. If yes, then the method proceeds to 910, otherwise the method returns to 950. When transfer is available the method continues to 960 where one or more files are sent from source device 210 to sink device 250. When all newly available files have been successfully sent, the method proceeds to 965 where the transfer method is complete.

In an embodiment, once a file becomes available for transfer, the device 210 establishes a connection to a remote device 250 for data transfer. In an embodiment, a Bluetooth connection is established over a Bluetooth channel. In an embodiment, a WiFi connection is established over a WiFi channel. Sink app 55 sends confirmation to source app 15 for each file that is received. Source app 15 receives confirmation from the remote device that the audio file was received, and in response disengages from data transfer to remote device 250. In an embodiment, one or more hardware components are moved to a low power state after confirmation of all files sent. In an embodiment, the source files are deleted from the source device 10 upon successful transfer. In an embodiment, a finite amount of storage is maintained on source device 10, and if the current storage does not allow for one additional max length file, then files are deleted from storage within device 10, oldest files first, until sufficient storage is available within storage 240 for at least one additional audio file.

In an embodiment of a WIFI connection between source device 210 and sink device 250, the source device 210 sets itself up as an access point to allow a user's device application software 15 to connect directly to device 250 without using an additional local WIFI connection as a gateway between device 210 and device 250. The advantage is that the file transfer can occur directly between source device 210 and sink device 250, allowing for the file transfer to occur anywhere the source device 210 and the sink device 250 are in range of each other.

In an embodiment, a device control component 25 makes use of a Bluetooth Low Energy device for a control path of the source device 210. In an embodiment, a WIFI connection is not required for use until the system needs to transfer files to a desired sink device 250. In an embodiment, this approach provides an advantage for power saving limiting the use of WIFI which then extends battery life dramatically.

In an embodiment, when a user desires to transfer one or more files from device 210 to device 250, a menu is displayed including a prompt on display 222, the prompt identifying one or more new files that have been created that could be transferred to a remote device. Upon selection of the prompt, the one or more files are sent over a wireless channel from device 210 to device 250. In an embodiment at 950, when communication cannot be established from a source app data transfer application 30 to a sink device 50 application, such as sink app 55, a display with a prompt appears on display 222 informing the user to open the sink app 55 and to select the sensor 227 when application 55 is ready. In an embodiment, a user then starts an operating system of sink device 50, navigates to a settings application 85, and opens a "wi-fi" subcomponent within settings 85. In an embodiment, the user checks to see if source device 10 is an available network. If there is no checkmark next to source app 15, the user elects to pair device 210 and device 250. In an embodiment, when the device 250 successfully pairs, a checkmark appears next to source app 15.

Turning now to FIG. 6, there is shown in screen 600 a representative home screen graphical user interface for a sink application 55 on a sink device 250. Screen 600 shows an array of data items that comprise files received by receive component 60 from a remote source app 15. Screen 600 shows three data items, each comprising a recently received file. Each of the three items is described respectively in graphical areas 630, 610 and 620. Graphical area 640 provides additional area for future files to be displayed. Graphical area 620 describes an item comprising a file denoted by automatically created serial number SN0003 that was created at 2:05 p.m. on Mar. 5, 2016. Graphical control 623 has a default message indicating that this particular item has not been named with a descriptive title as yet. When a user selects control 623, an annotation component 65 is invoked allowing a user to define a more descriptive title for the data item that comprises the file. In an embodiment, a voice capture component in device 250 makes use of a microphone incorporated into headphones 296 such that a user speaks a title for the data item comprising audio file SN0003. The audio from the new voice message is captured, voice recognized, and then the resulting text is displayed within control 623. In an embodiment, a user types on a physical keyboard or a soft keyboard or keypad a textual description to be displayed in control 623. In an embodiment, the last few seconds, e.g. 15 seconds of an audio file is automatically processed to create a textual description of each audio file drawn from all words, or important words gleaned from the audio at the end of a capture file.

Display area 610 shows an annotated display area for file SN0002 as shown in information field 615. The annotation for SN0002 is shown in graphical control 613 comprising the phrase "NANA YOU'RE SO OLD". This is an indicator that has been associated with an audio file to identify audio file SN0002 through an annotation that will spark the user's memory as to which audio is contained in file SN0002. The user is evidently a grandmother who had heard her grandson say something endearing or funny, and afterward had selected touch sensor 227 to capture the precious audio for future use.

Time display field 617 shows the time of original capture of the audio file. In an embodiment, a graphical area such as 610 also comprises the current size of each audio file, a time of editing, and other file specific data. A graphical control 611 nominally shows a default message indicating that the audio file has not yet been associated with a photograph. In an embodiment, graphical control 611 is selected to launch an annotation component 55 that allows, among other things the association of a photo with an audio file, to act as an indicator that identifies the underlying audio file. Graphical area 630 shows an audio item that has been annotated with a picture indicated in thumb-nail by graphical control 631, and by a textual annotation in control area 633. Graphical area 630 also shows a file serial number in field 635 and a time of collection in field 637.

In an embodiment, when a user selects within a display area 620, an annotation graphical user interface screen 700 is displayed, as shown in FIG. 7. Screen 700 displays a graphical control 760 that when selected allows a user to take a new photo with device 250 and to add the new photo to an item, so that the photo is associated with an audio file and with the other information that defines the item. Control 750 allows any photo on device 250 to be associated with an audio file. A photo, when associated, is shown in display area 740, and/or as a thumbnail in a display area such as 631. Control 715 is useable similar to control 623, but display screen 700 also provides a prompt 711 describing the sub-item to be provided to field 715. Field 705 shows the current length of the sound file. Slider 701 shows the length of the current audio file, and control 702 shows the progress of playing audio. In an embodiment, control 702 and control 701 are selectable. When selected, speaker 294 and/or headphones 296 begin playing audio, at the location within the audio that is selected by the user. Control 720 launches a communication program, such as a web-page, an email application, a messaging application, a social site, etc. that allows an item comprising the captured audio file, or the audio file itself to be sent to another recipient, e.g., through an internet network. Control 730 launches an audio editing application that provides more thorough control over the audio, to perform editing operations such as merging audio from other files, deleting unwanted portions of the underlying audio file, adding sound effects, performing audio enhancement, etc.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. A source device comprising:
a processor;
an application program having computer-usable instructions that when executed enable the processor to automatically record audio, the application program comprising:
a control application configured to
define an audio segment size, and
receive a command to begin the collection of audio information; and
an audio capture application, initiated by the control application, the audio capture application configured to store audio data incrementally in a first buffer,
monitor an amount of audio data stored in the first buffer,
receive a user-indication that recent data is interesting during the storing of audio data in the first buffer, and
resulting from receiving the user indication that recent data is interesting:
defining an end-of-capture record indicator,
determining a start-of-capture record indicator to provide maximum available data that is earlier than the end-of-capture record indicator by an amount of samples up to the defined audio segment size, and
automatically defining an audio file containing data derived from audio samples from the start-of-capture record indicator to the end-of-capture record indicator; and a data transfer component operating on data produced by the audio capture application, wherein the data transfer component is configured to transfer the audio file to a second storage area.

2. The source device of claim 1, wherein the data transfer component is further configured to:
   establish a connection to a remote device;
   send the audio file to the remote device;
   receive confirmation from the remote device that the audio file was received; and
   disengage from data transfer to the remote device subsequent to receiving the confirmation from the remote device that the audio file was received.

3. The source device of claim 1, wherein the data transfer component transfers data from the first buffer located in the storage of the source device to a second storage area located in the storage of a second device.

4. The source device of claim 1, wherein the first buffer is located in the random access memory of the source device and the second storage area is located in an SD card of the source device.

5. The source device of claim 1, wherein the control application communicates with a remote device capable of receiving user input to indicate a setting, and wherein the source device locally stores the setting.

6. The source device of claim 5, wherein the setting is chosen from a set consisting of an audio capture segment size, a capture parameter, a link detail parameter, a file format, an item detail, a home screen option, a data link option, an auto-start mode, a short file mode, a listening mode, and a low-power mode.

7. The source device of claim 1, wherein the data transfer component is further configured to:
   establish a connection to a remote device;
   send a list of audio segments defining capture data;
   transfer segments in the list; and
   return to a low-power mode upon the confirmation from the remote device that the segments in the list were received.

8. One or more non-transitory computer-readable media having computer-usable instructions embodied thereon that when executed, enable a given processor to perform a method for automatically recording audio, the method comprising:
   an audio segment size;
   receiving a command to begin the collection of audio information; storing audio data incrementally in a first buffer; monitoring an amount of audio data stored in the first buffer; receiving a user-indication that recent data is interesting during the storing of audio data in the first buffer; and
   resulting from receiving the user indication that recent data is interesting:
   defining an end-of-capture record indicator;
   determining a start-of-capture record indicator to provide maximum available data that is earlier than the end-of-capture record indicator by an amount of samples up to the defined audio segment size;
   automatically defining an audio file containing data derived from audio samples from the start-of-capture record indicator to the end-of-capture record indicator; and
   transferring the audio file to a second storage area.

9. The computer-readable media of claim 8, further comprising:
   establishing a connection to a remote device;
   sending the audio file to the remote device;
   receiving confirmation from the remote device that the audio file was received; and
   disengaging from data transfer to the remote device subsequent to receiving the confirmation from the remote device that the audio file was received.

10. The computer-readable media of claim 8, wherein the data transfer component transfers data from the first buffer is-located in the storage of a first device to a second storage area is located in the storage of a second device.

11. The computer-readable media of claim 8, wherein the first buffer is located in the storage of a first device and the second storage area is located in an SD card.

12. The computer-readable media of claim 8, further comprising:
   communicating with a remote device capable of receiving user input to indicate a setting, and locally storing the setting.

13. The computer-readable media of claim 12, wherein the setting is chosen from a set consisting of an audio capture segment size, a capture parameter, a link detail parameter, a file format, an item detail, a home screen option, a data link option, an auto-start mode, a short file mode, a listening mode, and a low-power mode.

14. The computer-readable media of claim 8, further comprising:
   establishing a connection to a remote device;
   sending a list of audio segments defining capture data;
   transferring segments in the list; and
   returning to a low-power mode upon the confirmation from the remote device that the segments in the list were received.

15. A computerized system comprising:
   a source device comprising a source application wirelessly coupled to a sink device comprising a sink application, wherein the sink application comprises:
   a settings component that receives user input indicating an audio capture segment size, which is subsequently communicated to the source application to define an audio segment size within the source application;
   a receive component capable of receiving one or more audio files by communicating wirelessly with a data transfer component within the source application; and
   an annotation component capable of associating identifying indicia with an audio file received by the receive component, and wherein the source application comprises:
   an initialization component that begins capture of audio by storing audio incrementally in a first buffer located in the random access memory of the source device;
   a capture component that:
   monitors an amount of audio data stored in the first buffer, receives a user-indication that recent data is interesting during the storing of audio data in the first buffer, and resulting from receiving the user indication that recent data is interesting:
   defines an end-of-capture record indicator; and
   determines a start-of-capture record indicator to provide maximum available data that is earlier than the end-of-capture record indicator by an amount of samples up to a predefined audio segment size; and
   a data transfer component that automatically defines an audio file containing data derived from audio samples from the start-of-capture record indicator to the end-of-capture record indicator and transfers the audio file to a second storage area.

16. The system of claim 15, wherein the annotation component is configured to graphically show an array of one or more data items that comprise received files.

17. The system of claim 16, further comprising:
a graphical control within a data item that when selected facilitates further annotation of the data item.

18. The system of claim 15, wherein the annotation component is configured to graphically display an annotation graphical user interface for a data item with at least one graphical control.

19. The system of claim 18, wherein the at least one graphical control includes a control selected from the set consisting of a new photo control, device photo control, an edit control, a description control, a share control, a play control, a communication control, an email control, a webpage control, a messaging control, and a social site control.

20. The system of claim 15, wherein the source device comprises a watch body including an audio input port, and a touch sensor, wherein the second storage area is located in an SD card of the source device.

\* \* \* \* \*

UNITED STATES PATENT AND TRADEMARK OFFICE
CERTIFICATE OF CORRECTION

PATENT NO. : 10,460,743 B2
APPLICATION NO. : 15/862324
DATED : October 29, 2019
INVENTOR(S) : Max J. Younger and Christian Cochran Page 1 of 1

It is certified that error appears in the above-identified patent and that said Letters Patent is hereby corrected as shown below:

In the Claims

Column 19, Line 45: Before "an" insert --defining--.
Column 20, Line 08: Before "located" delete "is-".
Column 20, Line 09: Before "located" delete "is".

Signed and Sealed this
Twenty-fourth Day of November, 2020

Andrei Iancu
*Director of the United States Patent and Trademark Office*